UNITED STATES PATENT OFFICE.

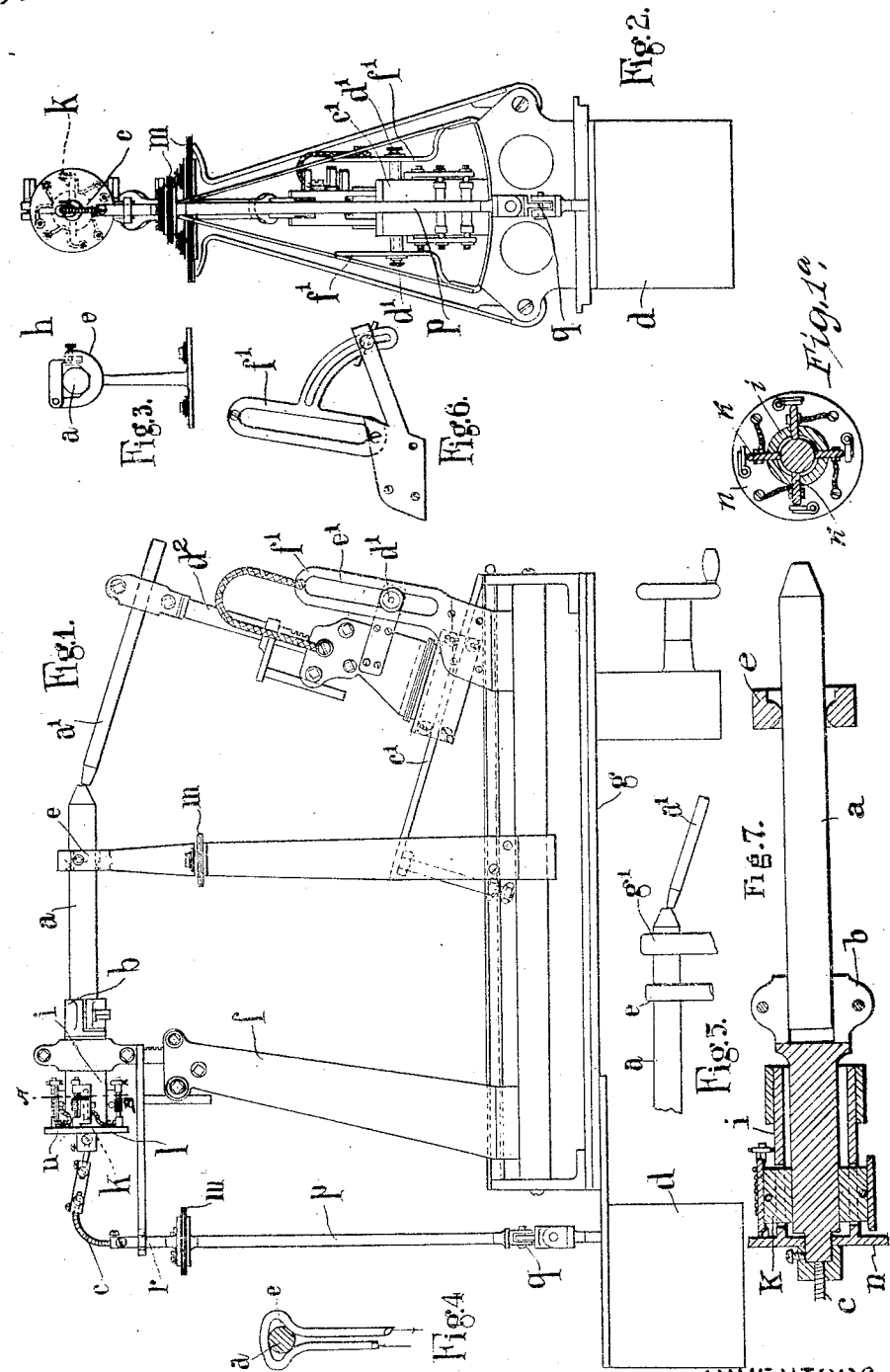

HORACE BERE GRYLLS, OF WEYBRIDGE, AND WALTER HEAPE, OF LONDON, ENGLAND.

ELECTRIC-ARC LAMP.

1,364,751.　　　　Specification of Letters Patent.　　Patented Jan. 4, 1921.

Application filed April 1, 1919. Serial No. 286,749.

*To all whom it may concern:*

Be it known that we, HORACE BERE GRYLLS, J. P., a subject of the King of Great Britain and Ireland, and residing at Amerden House, Oatlands Chase, Weybridge, in the county of Surrey, England, and WALTER HEAPE, F. R. S., a subject of the King of Great Britain and Ireland, and residing at 10 King's Bench Walk, Temple, London, E. C. 4, England, have invented certain new and useful Improvements in and Relating to Electric-Arc Lamps, of which the following is a specification.

This invention relates to electric arc lamps and while it is particularly designed for arc lamps that are to be used in searchlight installations it is capable of application to such devices generally.

In connection with such devices it is found desirable to provide means for rotating the positive carbon in order to obtain the most efficient results from the arc but this gives rise to difficulties owing to the fact that commercial carbons are in general somewhat curved or arcuate longitudinally with the result that the carbon cannot be held at its rear end only in an ordinary form of rotating chuck as in such cases the crater would describe a circular path, the diameter of which would be determined by the curvature of the carbon.

It has heretofore been proposed to provide a rotatable carbon mounted in forward and rear bearings, which snugly engage the carbon, but with a warped carbon, this construction will cause the carbon to bind in the bearings and break the former.

One object of the present invention is to provide improved means whereby even a curved carbon may be readily rotated in such a manner that the crater will revolve approximately true without describing a circular path of any appreciable diameter, the invention being applicable both in cases where the carbons are in alinement and also where they are inclined to one another.

According to our invention we provide two bearing surfaces for the rotating element, one being located at or near the front end of the carbon while the other is arranged around the spindle or other part of the chuck or member holding the rear end of the carbon, the bearing surfaces being preferably narrow and being provided with a small amount of clearance over the carbon and spindle respectively.

Hitherto it has been usual to mount the inclined carbon upon a slide which is arranged parallel to the axis of the carbon and to introduce link-work for the purpose of moving the carbon support, but such mechanism from its very nature introduces errors into the rate of feeding of the carbons, with the result that it is impossible to maintain the arc in focus or to obtain the most efficient results from the installation.

A further object of the present invention is to overcome the above difficulty by providing means which will enable the inclined carbon to be fed relatively to the other carbon at a uniform rate which may bear any desired ratio to the rate of feed of the first carbon, and the invention consists in an electric arc lamp of the kind referred to in which the inclined carbon is moved by means of a member which is slidable in a slotted member, the inclination of which slot to a line at right angles to the axis of the other carbon bears a definite relation to the angle between the axes of the two carbons depending upon the desired ratio between the rates of feed of the respective carbons.

The invention also consists in forming the support for the front end of the carbon in such a manner that it may be continuously cooled.

The invention further consists in providing a cooled shield between the arc and the front support for the carbon.

The invention also comprises other details hereinafter described or indicated.

The accompanying drawings illustrate one form of apparatus in accordance with the invention.

Figure 1 is a side elevation.

Fig. 1ᵃ is a section on the line A—B of Fig. 1.

Fig. 2 is a front elevation.

Fig. 3 is a front elevation of a part shown in Fig. 1; while

Fig. 4 shows a modified form of support for the carbon.

Fig. 5 is a view showing a support for the carbon and a shield for said support and Fig. 6 shows a modification of a part shown in Fig. 1.

Fig. 7 is a horizontal detail sectional view of the rotatable carbon and its supporting bearings.

In carrying our invention into effect in one convenient manner as, for example, in its application to a searchlight arc, we adapt the positive carbon $a$ of the searchlight to be held in any suitable form of chuck $b$, the spindle of which may be rotated by any suitable means as, for example, by the intervention of a flexible shaft $c$ or with any other suitable form of transmission gearing interposed between the chuck and the clockwork motor $d$ or other power device employed. The forward end of the carbon is adapted to pass through a ring $e$ or like bearing surface which is preferably narrow and which shows a small amount of clearance, say, for example, one or one and one-half millimeters, over the carbon, while a second bearing ring $n$ is adapted to surround the chuck spindle and is similarly formed with a slight clearance, this clearance being, if desirable, made smaller than the other as it has not to allow for any differences in diameter of carbons incidental to their manufacture. The two bearing rings or other members may be mounted upon or carried by the structure $g$ in any suitable or convenient manner, and it is advantageous to locate the rear bearing ring $n$ as far back as possible.

Such an arrangement permits of the employment of carbons which may be very considerably distorted out of the rectilinear, while at the same time the crater will revolve truly or approximately so, and it will be obvious that the size of the bearing rings or link members and their arrangement relatively to one another may be suitably modified to suit any particular carbon or class of carbon that is to be employed.

Furthermore, the front bearing ring may be made adjustable in any suitable manner, as for example, it may be formed from a fixed and movable part (Fig. 3) hinged together and secured relatively to one another by a screw $h$. It is also preferred to form it as shown, with the front portion acting as a shield to the actual bearing surface so that the flame of the arc is prevented from playing directly upon the latter.

The chuck spindle is preferably prolonged and is adapted to rotate within a metal tube or sleeve $i$ of convenient size which may be formed integral with or rigidly secured to the above-mentioned ring in which the spindle rotates—the diameter of this ring being sufficient to allow for the eccentric movements of the chuck spindle consequent on the distortion of the carbon—and this tube or sleeve being held by the positive standard $f$ of the lamp is therefore in electrical connection with it. The tube is also provided with radial or other suitable slots or openings in which are located brushes $k$ consisting of silver, laminated copper, copper gauze, carbon copper or other suitable material, which are kept by springs $l$ or other suitable means in contact with and so convey current to the chuck spindle and thence to the carbon.

The front bearing ring and the flexible shaft or other member driving the chuck spindle are insulated by means of mica or other heat-resisting insulating material $m$ from the body of the lamp, the front bearing ring being conveniently, though not necessarily, secured to or formed in one with the magnetic ring or its standard which is to be found in most searchlight installations.

The positive carbon $a$ is fed at a definite rate by moving the standard $f$ by means of the usual rotatable screwed spindle engaging said standard.

In order to accommodate for the movement of the carbons toward one another, the driving rod $p$ is connected with the clockwork or other motor spindle by a universal joint $q$ and an elongated or enlarged aperture $r$ is provided through which the rod $p$ passes.

Suitable rack and pinion or other adjusting means may be provided for adjusting the positive carbon to be accurately in the focus of the reflector, after which the adjustments are fixed, and all the adjusting of the carbons relatively to one another is effected by similar suitable means provided in connection with the negative carbon $a'$.

The negative carbon $a'$ is non-rotatable and is carried by a pillar or standard $d^2$ in such a manner that the axis of the carbon is arranged at an inclination to that of the positive carbon, the pillar or support being adapted to be slidable upon a base or slide $c'$ so that the support may be moved bodily in a direction which is parallel to the axis of the negative carbon, that is, which is at an inclination to the horizontal parallel to the inclination of the negative carbon. The slide $c'$ is preferably formed from two runners set widely apart to increase stability.

The negative carbon support or pillar (which may run upon rollers or the like) is adapted to be moved by means of a pin, roller or other member $d'$ engaging a slot $e'$ in a bracket $f'$ which is adapted to be moved by the feed screw by means of a nut or the like, the slotted member being arranged at a definite inclination to the vertical, the angle of inclination being adjusted to suit the desired ratio between the rates of feeds of the respective carbons.

If, for example, it is desired to feed the carbons at equal rates, and the brackets *f* and *f'* are fed toward each other at equal rates of speed then the angle between the slot *e'* and the vertical should be one-half the angle of inclination to the horizontal of the negative carbon, that is, one-half the angle of inclination of the carbons relatively to one another, this form of construction being that shown in the drawing.

Where the dimensions of the carbons require that the rates of feed should be unequal, this may be provided by adjusting the angle of the slotted guide or like member *f'* and this may be provided for by making the slotted member adjustable (as shown in Fig. 6).

Fig. 4 shows a modified form of front support *e* for the carbon which is formed from copper or other tubing adapted to be cooled by water or other cooling medium passed through the tube.

Fig. 5 illustrates a modification in which any liability to damage to the front support *e* by the arc connecting therewith is prevented by the interposition between the support of an insulator shield *g'* adapted to be water or otherwise cooled, and preferably slightly larger than the front bearing.

It is to be understood that the invention is not to be confined to the details of construction which are hereinbefore given by way of example, as we may employ our invention with equal effect and like advantage with any type of installation in which the carbons are arranged at an inclination to one another; whether either or both of such carbons be rotatable or not, and we modify the form of mechanism for feeding the carbons depending upon the particular type and construction of installation to which the invention is to be applied.

It is to be understood that the foregoing details of construction are given by way of example only, as we may modify our arrangement of bearing surfaces and also the manner of conveying current to and feeding the carbon, depending upon any particular practical requirements that may have to be fulfilled, or the type or construction of searchlight installation to which the invention is to be applied.

Having now described our invention, what we claim as new and desire to secure by Letters Patent is:—

1. An electric arc lamp including forward and rear bearings, a chuck having a spindle rotatably mounted in the rear bearing, a carbon carried by the chuck and mounted in the forward bearing, the forward bearing having an internal diameter considerably larger than the diameter of the carbon, spaced projections extending inwardly in the surface of the forward bearing and engaging the carbon only at spaced points, the rear bearing being constructed to permit rocking movement of the chuck spindle, and means for rotating the chuck to cause the carbon to rotate about its own axis.

2. An electric arc lamp including a rotatable carbon, a second carbon arranged at an angle to the first carbon, an inclined slotted member, a movable member carrying the second carbon and having a part slidably mounted in the slot of the slotted member, the inclination of said slot to a line at right angles to the axis of the first carbon bearing a definite relation to the angle between the axes of the two carbons.

3. An electric arc lamp including a rotatable carbon, a second carbon arranged at an angle to the first carbon, an inclined slotted member, a movable member carrying the second carbon and having a part slidably mounted in the slot of the slotted member, and means for varying the inclination of the slotted member.

4. An electric arc lamp as claimed in claim 1, in which the front bearing for the carbon is formed from copper or other tubing through which water or other cooling medium is passed.

5. An electric arc lamp of the kind defined by claim 1, in which the forward bearing for the carbon is formed from tubing through which a water or other cooling medium is passed and in which a cooled shield is interposed between the forward end of the carbon and the forward bearing of the carbon.

In testimony whereof we have signed our names to this specification.

HORACE BERE GRYLLS.
WALTER HEAPE.